(12) United States Patent
Pereira et al.

(10) Patent No.: US 11,025,648 B2
(45) Date of Patent: Jun. 1, 2021

(54) DETECTION OF ALGORITHMICALLY GENERATED DOMAINS BASED ON A DICTIONARY

(71) Applicant: Infoblox Inc., Santa Clara, CA (US)

(72) Inventors: Mayana Pereira, Tacoma, WA (US); Vadym Tymchenko, Issaquah, WA (US); Bin Yu, Pleasanton, CA (US)

(73) Assignee: Infoblox Inc., Santa Clara, CA (US)

( * ) Notice: Subject to any disclaimer, the term of this patent is extended or adjusted under 35 U.S.C. 154(b) by 355 days.

(21) Appl. No.: 15/967,346

(22) Filed: Apr. 30, 2018

(65) Prior Publication Data

US 2019/0089721 A1     Mar. 21, 2019

Related U.S. Application Data

(60) Provisional application No. 62/561,590, filed on Sep. 21, 2017.

(51) Int. Cl.

| | |
|---|---|
| *H04L 9/00* | (2006.01) |
| *H04L 29/06* | (2006.01) |
| *H04L 29/12* | (2006.01) |
| *G06F 16/951* | (2019.01) |
| *G06F 16/901* | (2019.01) |

(52) U.S. Cl.
CPC ...... *H04L 63/1416* (2013.01); *G06F 16/9024* (2019.01); *G06F 16/951* (2019.01); *H04L 61/1511* (2013.01); *H04L 63/145* (2013.01); *H04L 63/1425* (2013.01)

(58) Field of Classification Search
CPC ............. H04L 63/145; H04L 63/1425; H04L 63/1416; G06F 16/951; G06F 16/9024
See application file for complete search history.

(56) References Cited

U.S. PATENT DOCUMENTS

2018/0097835 A1*   4/2018   McGrew ............ H04L 61/1511

OTHER PUBLICATIONS

Lee, et al. Apr. 28, 2014, "GMAD: Graph-based Malware Activity Detection by DNS traffic analysis", Computer Communication Journal, pp. 33-47.*
Alexa Internet, Inc., Alexa—Keyword Research, Competitive Analysis, and Website Ranking, Apr. 28, 2018, retrieved from Internet archive: https://web.archive.org/web/20180428022219/https://www.alexa.com/.
Antonaikakis et al., From Throw-Away Traffic to Bots: Detecting the Rise of DGA-Based Malware, USENIX Security Symposium, vol. 12, 2012.
Blondel et al., Fast Unfolding of Communities in Large Networks, Jul. 25, 2008.

(Continued)

*Primary Examiner* — Beemnet W Dada
(74) *Attorney, Agent, or Firm* — Van Pelt, Yi & James LLP

(57) ABSTRACT

Techniques for detection of algorithmically generated domains based on a dictionary are disclosed. In some embodiments, a system, process, and/or computer program product for detection of algorithmically generated domains based on a dictionary includes receiving a DNS data stream, wherein the DNS data stream includes a DNS query and a DNS response for resolution of the DNS query; generating a graph based on the DNS data stream; and identifying a malicious dictionary based on the graph.

20 Claims, 11 Drawing Sheets

(56) References Cited

OTHER PUBLICATIONS

Chen et al., A Simple and Effective Unsupervised Word Segmentation Approach, Proceedings of the 25th AAAI Conference on Artificial Intelligence, 2011.
Farsight Security, farsightsecurity.com, Feb. 24, 2018, retrieved from internet archive: https://web.archive.org/web/20180224085700/https://www.farsightsecurity.com/.
Geffner et al., Crowdstrike, End-to-End Analysis of a a Domain Generating Algorithm Malware Family, Proceedings of the 2013 Blackhat Conference, 2013.
Google Books, Ngram Viewer, Apr. 11, 2018, retrieved from internet archive: https://web.archive.org/web/20180411162318/http://storage.googleapis.com/books/ngrams/books/datasetsv2.html.
J Bader, Domain Generation Algorithms, Dec. 17, 2015.
Krishnan et al., Crossing the Threshold: Detecting Network Malfeasance via Sequential Hypothesis Testing, In Dependable Systems and Networks (DSN), 2013 43rd Annual IEEE/IFIP International Conference, 2013.
Lison et al., Automatic Detection of Malware-Generated Domains with Recurrent Neural Models, Sep. 20, 2017.
Ma et al., Beyond Blacklists: Learning to Detect Malicious Web Sites from Suspicious URLS, KDD' 09, Jun. 28-Jul. 1, 2009.
McGrath et al., Behind Phishing: An Examination of Phisher Modi Operandi, LEET, 2008.
Mowbray et al., Finding Domain-Generation Algorithms by Looking at Length Distributions, 2014 IEEE International Symposium on Software Reliability Engineering Workshops, Nov. 3-6, 2014.
Pinheiro et al., A #Hashtagtokenizer for Social Media Messages, International Journal of Computational Linguistics and Application, vol. 6, No. 2, 2015, pp. 141-158, Dec. 20, 2015.
Plohmann et al., A Comprehensive Measurement Study of Domain Generating Malware, Proceedings of the 25th USENIX Security Symposium, Aug. 10-12, 2016.
Schiavoni et al., Phoenix: DGA-based Botnet Tracking and Intelligence, International Conference on Detection of Intrusions, Malware, and Vulnerability Assessment, 2014.
Stanislav Skuratovich, Check Point Software Technologies LTD., MATSNU, Malware ID, May 15, 2015.
Woodbridge et al., Prediciting Domain Generation Algorithms with Long Short-Term Memory Networks, Nov. 2, 2016.
Yadav et al., Detecting Algorithmically Generated Malicious Domain Names, In Proceedings of the 10th ACM SIGCOMM Conference on Internet Measurement, 2010.
Yu et al., Behavior Analysis based in DNS Tunneling Detection and Classification with Big Data Technologies, Proceedings of the International Conference on Internet of Things and Big Data, 2016.
Yu et al., Character Level Based Detection of DGA Domain Names, ICLR 2018 Conference Blind Submission, Feb. 15, 2018.
Yu et al., Inline DGA Detection with Deep Networks, 2017 IEEE International Conference on Data Mining Workshops, 2017.
Yu et al., Semi-supervised Time Series Modeling for Real-Time Flux Domain Detection on Passive DNS Traffic, Proceedings of the 10th International Conference on Machine Learning and Data Mining, 2014.

* cited by examiner facegone.net.

walkroad.net.

weakdont.net.

sellfool.net.

weakheat.net.

deepaunt.net.

facethey.net.

ballpull.net.

pushaunt.net.

walklift.net.

bothfive.net.

facegoes.net.

FIG. 9A mastermanmerrickson.net.

laurenciamichaelson.net.

jacquelynchristophers.net.

gweneverechristison.net.

christianchristianson.net.

rosalynnemottershead.net.

creightonthaddeus.net.

jacquelynjeremiah.net.

creightonnathaniel.net.

priscilladwerryhouse.net.

christinajeremiah.net.

kassandraterrence.net.

FIG. 9B

DETECTION OF ALGORITHMICALLY GENERATED DOMAINS BASED ON A DICTIONARY

CROSS REFERENCE TO OTHER APPLICATIONS

This application claims priority to U.S. Provisional Patent Application No. 62/561,590 entitled DETECTING CORRELATIONS OF WORDLIST-BASED DGA IN DNS TRAFFIC filed Sep. 21, 2017 which is incorporated herein by reference for all purposes.

BACKGROUND OF THE INVENTION

Domain Generation Algorithms (DGAs) are now commonplace among malware. DGA malware automatically generates large numbers of domain names in Domain Name System (DNS) domain fluxing, in order to bypass domain blacklisting.

For example, DGAs are often used by botnet controllers (e.g., masters of bots) for Command-and-Control (C&C) communications of botnets to dynamically produce a large number of random domain names and select a relatively small subset of those domain names for actual command and control use. In order to mitigate the risk presented by these large numbers of potentially malicious domains, it is useful to be able to automatically detect DGA generated Uniform Resource Locators (URLs).

BRIEF DESCRIPTION OF THE DRAWINGS

Various embodiments of the invention are disclosed in the following detailed description and the accompanying drawings.

FIGS. 9A and 9B is an example of how the disclosed techniques for detection of algorithmically generated domains based on a dictionary can automatically analyze such example DDGA generated domains to determine that such are DDGA generated domains and extract the dictionary being used by the DDGA in accordance with some embodiments.

DETAILED DESCRIPTION

Figure 1:
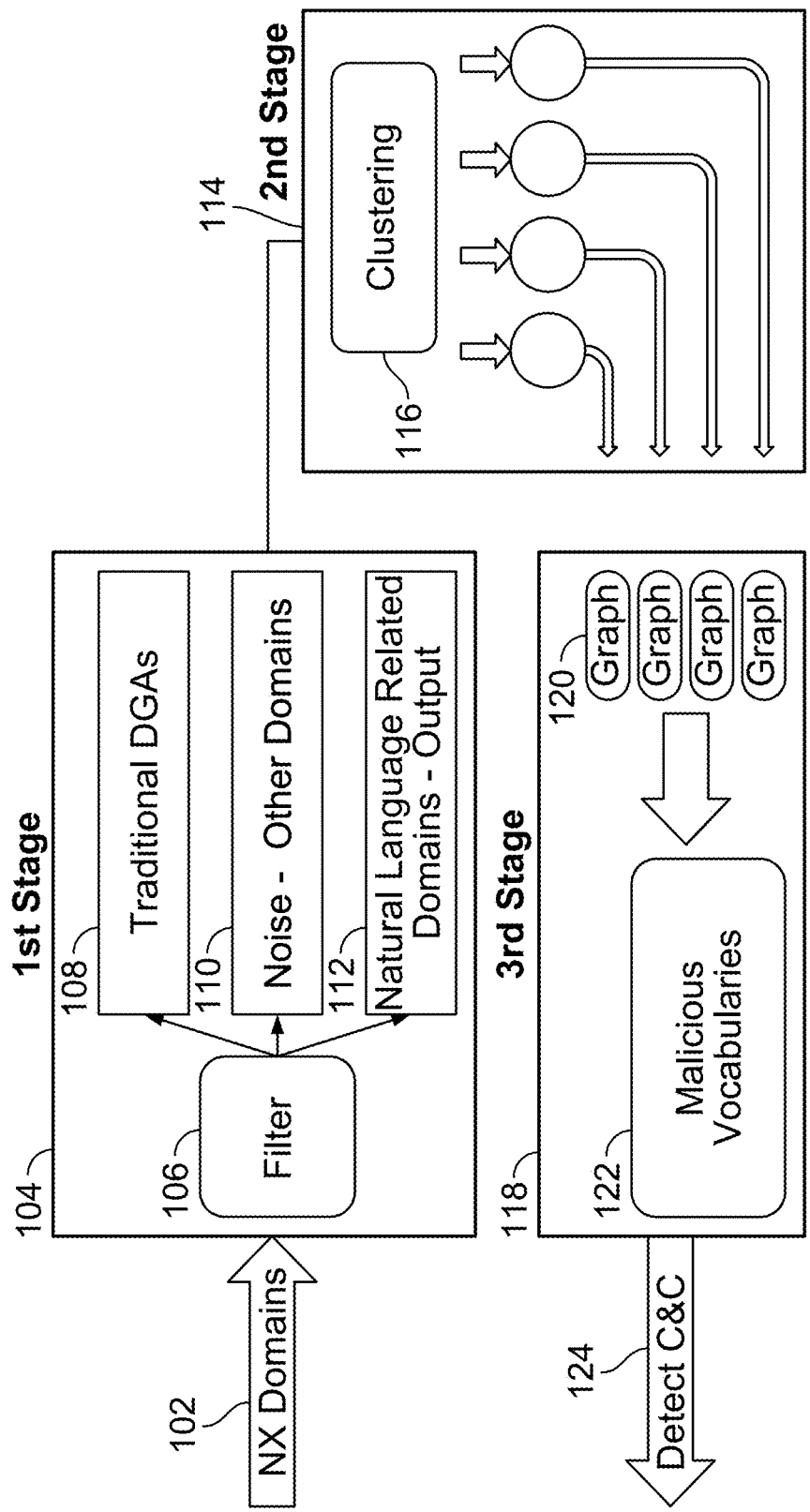
FIG. 1 is a diagram of a system architecture for detection of algorithmically generated domains based on a dictionary in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generally, a client (e.g., a computing device) attempts to connect to a server(s) over the Internet by using web addresses (e.g., Uniform Resource Locators (URLs) including domain names or fully qualified domain names); the aforesaid are translated into IP addresses. The Domain Name System (DNS) is responsible for performing this translation from web addresses into IP addresses. Specifically, requests including web addresses are sent to DNS servers that reply with corresponding IP addresses or with an error message in case the domain has not been registered, a non-existent domain (e.g., an NX Domain response, also referred to herein as an NXDOMAIN response, is returned by DNS servers for a non-existent domain). This mechanism is also used by malicious software (e.g., malware) to communicate with their Command-and-Control (C&C) center (e.g., botnet controller server(s) accessible via the Internet).

However, instead of using a single hard-coded domain to communicate with its C&C center (e.g., which could be easily blocked using domain blacklisting); certain malware uses a more sophisticated mechanism known as Domain Generation Algorithms (DGAs). DGAs are now commonplace among malware. Generally, DGA malware automatically generates large numbers of domain names in Domain Name System (DNS) domain fluxing, in order to bypass domain blacklisting.

For example, DGAs are often used by botnet controllers for Command-and-Control (C&C) communications of botnets to dynamically produce a large number of random domain names and select a relatively small subset of those domain names for actual C&C communications. In order to mitigate the risk presented by these large numbers of potentially malicious domains, it would be useful to be able to automatically detect DGA generated domain names/URLs.

Traditional DGA algorithms typically start from random seeds, producing domains that are distinctly different from usual benign domains. Traditional DGA generated domains generally appear more random, such as, for example, the domain sgxyfixkhuark.co.uk generated by the malware known as Cryptolocker. Traditional DGAs are typically detected using approaches that leverage the distribution of characters in the domain, either through human engineered lexical features (see M. Antonakakis, R. Perdisci, Y. Nadji, N. Vasiloglou II, S. Abu-Nimeh, W. Lee, and D. Dagon, From Throw-Away Traffic to Bots: Detecting the Rise of DGA-based Malware, USENIX Security Symposium, Volume 12, 2012; and S. Schiavoni, F. Maggi, L. Cavallaro, and S. Zanero, Phoenix: DGA-based Botnet Tracking and Intelligence, International Conference on Detection of Intrusions and Malware, and Vulnerability Assessment, pages 192-211, 2014) or through training deep neural networks (see B. Yu, J. Pan, J. Hu, A. Nascimento, and M. De Cock, Character Level Based Detection of DGA Domain Names, 15 Feb. 2018, ICLR 2018 Conference Blind Submission, https://openreview.net/forum?id=BJLmN8xRW; J. Woodbridge, H. S. Anderson, A. Ahuja, and D. Grant, Predicting Domain Generation Algorithms with Long Short-Term Memory Networks, preprint arXiv:1611.00791, 2016; and B. Yu, D. Gray, J. Pan, M. De Cock, and A. Nascimento, Inline DGA Detection with Deep Networks, Proceedings of Data Mining for Cyber Security (DMCS2017), Workshop at ICDM2017 (IEEE International Conference on Data Mining), 2017). However, static prevention approaches including existing, traditional domain blacklisting approaches and existing, traditional sinkholing approaches are typically not effective in countering DGA malware.

A newer generation of DGA algorithms has appeared that renders detection by traditional DGA detection techniques much more difficult, namely, by producing domains that are less random, more human-readable domains (e.g., domains that generally include natural language content in a given language, such as English or another language). Specifically, dictionary-based DGAs (e.g., also referred to as wordlist-based/dictionary DGAs or DDGAs) generate domains by concatenating two or more words from a wordlist (e.g., a set of words, also referred to as a dictionary or a malicious dictionary). For example, the malware known as Suppobox, a known dictionary DGA (e.g., other well-known dictionary DGA families include Matsnu, Banjori, Gozi, and others), produces less random, more human-readable domains generated from a dictionary/wordlist, such as the following domains: heavenshake.net, heavenshare.net, and leadershare.net (see D. Plohmann, K. Yakdan, M. Klatt, J. Bader, and E. Gerhards-Padilla, A Comprehensive Measurement Study of Domain Generating Malware, 25th USENIX Security Symposium (USENIX Security 16), pages 263-278, Austin, Tex., 2016).

Traditional DGA detection techniques based on frequency analysis of characters do not perform well against this new class of DGAs (i.e., DDGAs). Recently, deep learning techniques were able to detect such domains for one specific DGA family (see P. Lison and V. Mavroeidis. Automatic Detection of Malware-Generated Domains with Recurrent Neural Models, arXiv preprint arXiv:1709.07102, 2017) in the case of a large number of such domains available for training (e.g., over 40,000 domains available for samples were available for training input for such deep learning classifiers). However, the same approach did not work when such a large number of samples was not available. Moreover, if the dictionary is ever changed (e.g., which typically happens periodically/often), then the new domains produced by the new dictionary would not be detected using such an approach.

In addition, for detecting dictionary DGAs, traditional DGA detection approaches typically require additional contextual information, such as the IP address of the source or information about the time when that domain was sent to the DNS server. However, such contextual information can be expensive to acquire, or due to privacy concerns, it may simply not be available.

Another approach to detect dictionary DGAs is to reverse engineer the malware, extracting the list of words in the dictionary and using this list to detect domains that are generated by the malware. However, this approach is labor intensive and time consuming, and this approach is also typically not effective at timely detecting new dictionary DGA malware (e.g., as soon as it emerges/is used in the wild).

Moreover, existing approaches for DGA detection typically focus on differentiating the probability distributions of characters and sequences of characters of benign domains and DGA domains. In this setting, the probability distribution of DDGAs is typically indistinguishable from the probability distribution of the English language (or other languages).

Therefore, the existing approaches for DGA detection fail to effectively and efficiently detect this new class of DGA (i.e., DDGAs). For example, lexical features (e.g., domain length, unique characters, unique vowels, unique numbers, first level-domain length, second level-domain length, and entropy) can be effective for distinguishing domains produced from random seeds among benign domains, but such features are generally not effective or efficient for distinguishing domains produced from dictionary words.

As such, the existing, traditional approaches for DGA detection are not effective or efficient for detecting dictionary DGA (DDGA) malware. This is a current and growing problem as an estimated ten percent of current DGA activity in real DNS traffic is represented by DDGAs and will likely increase in the future. Thus, new and improved techniques for automatically detecting DDGA malware are needed.

Overview of Techniques for Detection of Algorithmically Generated Domains Based on a Dictionary Automatic detection of algorithmically generated domains facilitates effective detection of a botnet operation and/or of DGA related malware activity on a computing device/network, which can be applied for providing enhanced security on, for example, an enterprise network. As discussed above, machine learning based DGA detection approaches exploit the fact that domains generated by DGAs are linguistically different and significantly more random than those created by humans. A recent new class of DGAs, called dictionary DGAs (DDGAs), are avoiding detection by such machine learning based DGA detection approaches that rely on lexical analysis by generating domains based on wordlists (e.g., also referred to as dictionaries or malware dictionaries). The resulting domains are seemingly benign to both human analysis and most of the existing DGA detection approaches that receive as input solely the domain itself.

Technical problems for automated DDGA detection include, for example, the following: recovery of malicious dictionaries from actual, real DNS traffic, noisy datasets, new DDGAs are continually being created and used in the wild, and new patterns of DDGAs are continually emerging.

As discussed above, the existing, traditional approaches for DGA detection are not effective or efficient for detecting dictionary DGA (DDGA) malware. Thus, new and improved techniques for automatically detecting dictionary DGA (DDGA) malware are disclosed.

In some embodiments, new and improved techniques for automatic detection of domains generated by a DDGA are disclosed. Instead of using a traditional character probability distribution approach for pattern finding among NXDOMAIN traffic, the disclosed techniques automatically identify intersections between domains (e.g., NXDOMAINs) in order to find domains that are potentially formed by words that are generated from a dictionary (e.g., a common/shared vocabulary that includes a relatively small set of words, such as 30 to 50 or more words), in this specific case, domains that are generated by a DDGA.

Accordingly, various techniques for detection of algorithmically generated domains based on a dictionary are disclosed. In some embodiments, a system, process, and/or computer program product for detection of algorithmically generated domains based on a dictionary includes receiving a DNS data stream (e.g., a live DNS data stream that includes NXDOMAIN traffic), wherein the DNS data stream includes a DNS query and a DNS response for resolution of the DNS query; generating a graph based on the DNS data stream; and identifying a malicious dictionary based on the graph. For example, the disclosed techniques facilitate automatically detecting domains and malicious dictionaries associated with DDGA malware.

In some embodiments, the graph can include an edge between a pair of distinct domains included in the DNS data stream if the pair of distinct domains share a common string. For example, the graph can include an edge between a pair of distinct domains included in the DNS data stream if the pair of distinct domains share a common string at a beginning or end of each of the pair of distinct domains.

In some embodiments, a system, process, and/or computer program product for detection of algorithmically generated domains based on a dictionary further includes filtering the DNS data stream (e.g., using a classifier), wherein the DNS data stream is automatically filtered using a classifier to identify natural language related domains included in the DNS data stream (e.g., and to remove domains associated with traditional DGA malware); and outputting the filtered DNS data stream for generating the graph using the identified natural language related domains included in the DNS data stream.

In other embodiments, a system, process, and/or computer program product for detection of algorithmically generated domains based on a dictionary further includes filtering the DNS data stream (e.g., using a classifier), wherein the DNS data stream is automatically filtered using a classifier to identify natural language related domains included in the DNS data stream (e.g., and to remove domains associated with traditional DGA malware); and outputting the filtered DNS data stream for clustering the identified natural language related domains included in the DNS data stream prior to generating the graph based on the DNS data stream.

In some embodiments, a system, process, and/or computer program product for detection of algorithmically generated domains based on a dictionary further includes performing community detection using the graph to identify the malicious dictionary.

In some embodiments, a system, process, and/or computer program product for detection of algorithmically generated domains based on a dictionary further includes detecting command and control botnet related activity based on the malicious dictionary.

In some embodiments, a system, process, and/or computer program product for detection of algorithmically generated domains based on a dictionary includes receiving a DNS stream, wherein the DNS data stream includes a DNS query and a DNS response for resolution of the DNS query; detecting DNS activity associated with a malicious dictionary associated with a new DDGA malware based on the monitored live DNS traffic; and performing a mitigation action (e.g., blocking a DNS response or another action can be performed) in response to detecting DNS activity associated with the malicious dictionary associated with the new DDGA malware. For example, the disclosed techniques facilitate automatically detecting domains and malicious dictionaries associated with DDGA malware.

In some embodiments, a system, process, and/or computer program product for detection of algorithmically generated domains based on a dictionary further includes adding an IP address associated with a potentially malicious network domain to a blacklist.

In some embodiments, a system, process, and/or computer program product for detection of algorithmically generated domains based on a dictionary further includes sending an IP address associated with a potentially malicious network domain to a firewall.

In some embodiments, a system, process, and/or computer program product for detection of algorithmically generated domains based on a dictionary further includes generating a firewall rule based on a potentially malicious network domain; configuring a network device to block network communications with the potentially malicious network domain; quarantining an infected host, wherein the infected host is determined to be infected based on an association with the potentially malicious network domain; and adding the potentially malicious network domain to a reputation feed.

In some embodiments, a system, process, and/or computer program product for detection of algorithmically generated domains based on a dictionary further includes identifying a source IP address, a source host, or an attempt to query a potentially malicious network domain.

In some embodiments, the disclosed techniques perform an automated analysis of the behavior of domains in observed/monitored DNS traffic (e.g., actual, real DNS traffic, such as daily DNS traffic) according to a word intersection between domains. For example, the disclosed techniques can perform automatic detection of algorithmically generated domains based on a dictionary among NXDOMAIN traffic and an associated malicious dictionary (e.g., unsupervised detection of algorithmically generated domains based on a dictionary among NXDOMAIN traffic and extraction of a malicious dictionary used by the DDGA for domains generation). As further described below, a graph analysis is performed for detecting groups of domains that are formed by the same vocabulary/wordlist, that is, domains that are generated by the same DDGA using a malicious dictionary. The result of the graph analysis is a list of domains that 'connect' by having word intersections and also the list of words (e.g., malicious dictionary) that represent such intersections. The malicious dictionary detected from observed/monitored DNS traffic facilitates botnet C&C proxy/malware detection as further described below.

For example, the disclosed techniques can perform detection, in an unsupervised fashion, of domains generated by DDGA (e.g., domains with natural language content). As further described below, the disclosed techniques can detect the list of domains that were generated using a DDGA, and the associated vocabulary (e.g., wordlists, also referred to as dictionaries/malicious dictionaries for DDGAs) used to generate such domains.

Accordingly, the disclosed techniques can more effectively and more efficiently perform detection of dictionary DGAs. For example, the disclosed new DGA detection techniques can automatically learn and identify the wordlists (e.g., dictionary) used by dictionary DGAs from domain names in DNS traffic. As such, an effective and efficient DGA detection mechanism is provided for detecting this elusive, new class of DGA (i.e., DDGAs), without any need for reverse engineering of the DDGA malware to extract the wordlists/dictionaries. Moreover, the disclosed DGA detection techniques can effectively and efficiently identify dictionary DGA domain names in observed/monitored DNS traffic (e.g., actual, real DNS traffic, such as daily DNS traffic).

In some embodiments, the disclosed techniques for detection of algorithmically generated domains based on a dictionary can be performed based on the domain name strings (e.g., domain name strings only) and do not require any contextual information, such as IP addresses or timing related information associated with such DNS traffic data. As further described below, the experimental results on data from known dictionary DGA malware validate that the disclosed techniques can extract dictionary information that is embedded in the malware code even when the fraction of DGA domains is much smaller than the fraction of legitimate domains or multiple dictionaries are present in the observed/monitored DNS traffic data.

In some embodiments, the disclosed techniques for detection of algorithmically generated domains based on a dictionary include detecting and extracting a dictionary associated with a DDGA by observing domain name strings in DNS traffic. An observed DDGA behavioral pattern that is an example basis for the disclosed techniques is that words from the wordlist are generally used repeatedly by the DDGA in different combinations to generate domains. As such, these repetitions and combinations can be determined using the below-described graph-based analysis techniques to identify/isolate DDGA domains in traffic as further described below with respect to various embodiments. The disclosed techniques are generally agnostic to the dictionary used by the DGA, and in fact, can learn the dictionary by itself (e.g., extract the relevant malicious dictionary based on the observed DNS traffic data) as further described below. As a result, the disclosed techniques provide an effective and efficient solution for detecting DDGAs in actual, real DNS traffic. For example, if in the future a new DDGA malware starts generating domains with new dictionaries, the disclosed techniques would still effectively and efficiently detect the new DDGA malware, as shown in the below described experiments.

Even in a highly imbalanced scenario, such as a scenario in which the domain names generated by a specific dictionary DGA algorithm account for only about 0.1% of the DNS traffic, the below described DDGA detection techniques can still effectively identify/isolate these domain names and learn/extract the underlying dictionary from such DNS traffic with a 99.9% accuracy. In contrast, a random forest trained on lexical features crafted for detection of traditional DGAs fails to detect almost all of the dictionary DGA generated domain names, thereby highlighting DDGA detection performance improvements facilitated by the disclosed new and improved techniques for automated DDGA detection, such as will now be further described below.

Detecting Correlations of Wordlist-Based DGA (e.g., Dictionary DGA (DDGA)) in DNS Traffic Assume one has a set C containing q domain name strings $\{c_1 \ldots ; c_q\}$. Within C we have domains that are benign and domains that are generated by a Dictionary-based DGA. In this example, our goal is to detect all the domains generated by a dictionary DGA in C and to extract the dictionary used to produce these domains. We now briefly describe the main phases of an example implementation of our solution.

Extracting Words from Domains

In an example implementation, a word extraction method (e.g., implemented using a word detector component as described further below) 'learns' words from the set of domain name strings itself. Given that dictionary DGAs are known to use words repeatedly, we define a word as a sequence of at least m characters that appears in two or more domains within the set C. In the experimental results section, we use m=3. We produce a set D of words as follows:
1. Set D=∅
2. For every $c_i$ and $c_j$ in C, i, j∈{1, . . . , q},i≠j):
   Denote by $l_{i,j}$ the largest common substring in $c_i$ and $c_j$.
   If $|l_{i,j}|\geq m$, add to the list D.
3. Delete from 1) all the duplicated strings.|

It is important to point out that the above word extraction algorithm is applied to the entire set C, including both dictionary DGA domain names and non-dictionary DGA domain names. The resulting list D will therefore have many elements that are not words from a dictionary DGA. We will eliminate these words in a subsequent phase. To illustrate the word extraction algorithm, consider the following example domains: "facetype.com", "facetime.com", "bedtime.com", "faceboard.com", "bedboard.com", and "bedding.com".

The resulting list of common substrings is D=[face, time, bed, board, facet].

Graph-Based Dictionary Finding

In this example implementation, we initially split the set of domains C into smaller sets $C_1, \ldots, C_r$ such that all the domains within each $C_i$, i∈{1, . . . , r} have the same top-level domain (TLD). For each $C_i$, we define a graph $G_i$ as follows. The nodes of this graph are words from the list D. Two nodes (words) of $G_i$ are connected if they co-occur in the same domain in $C_i$, that is, if there exists at least one domain $c_j \varepsilon C_i$, so that these words are both substrings of $c_j$. The division by TLD is done since DDGAs generally use a limited number of different TLDs.

The nodes in each graph $G_i$ that represent words from a dictionary DGA will have a higher connectivity than words that come from benign domains, because DDGA generated domain names are generally generated by concatenating words from a small dictionary (e.g., about 30 to 50 (or higher number of) words per day and generally utilize a high reuse rate of words). Therefore, we filter out all the nodes (words) with a degree less than 3 (e.g., a value experimentally determined, however, a higher or lower degree may also be utilized). Next, we identify the connected components of each graph $G_i$. We expect that dictionaries from DDGAs will appear as such connected components.

The above-described operations can be performed in a fully unsupervised machine learning implementation, that is, without knowledge of which domains in C are generated by a DDGA and which ones are not, as further described below with respect to various embodiments.

Identification of Connected Components

In this example implementation, for each connected component within a graph we determine the following structural features. Given a graph $G_i=(\mathcal{N},\mathcal{L})$, where links $\mathcal{L}$ connects pairs of nodes N, and the number of nodes and links in the graph are, respectively, $N=|\mathcal{N}|$ and $L=|\mathcal{L}|$. The function $d(x)$ expresses the degree of a node $x\varepsilon \mathcal{N}$. In this example, the structural properties used are as follows: (i) Average Node Degree (mean(d(x)), for $x\varepsilon \mathcal{N}$); (ii) Maximum Node Degree (max(d(x)), for $x\varepsilon \mathcal{N}$); (iii) Number of Cycles (c—Number of cycles which form a basis for cycles of G); and (iv) Average of Cycles per node (c/N). The example feature list can be expanded to any number of structural graph properties.

Training and Classification of Connected Components

In this example implementation, given a set of domains $C_{Label}$ that has been labeled (e.g., we know which domains are DGA and which domains are benign), we run $C_{Label}$ through the previous steps and obtain all the connected components of all the graphs $G_i$ derived from $C_{Label}$. We manually label (DGA/non-DGA) every connected component in every graph $G_i$. We then represent each connected component by a vector containing the structural features (i)-(iv), an id number, and the label DGA/non-DGA. These vectors (denote this set of vectors by $V_L$) are then used as a training set. The training set is used to train a supervised learning machine learning model. The model is based in a supervised learning algorithm, such as for example, a k-nearest neighbor (k-nn) algorithm, with a k=3. The k-nn model can also later be used for classifying new vectors (even vectors formed with a completely different dictionary) without human intervention.

Classification of Domain Names

In this example implementation, once the dictionaries are available from the previous operations, we flag a domain as malicious if it has, for example, at least two words from a dictionary.

Evaluation

Experimental Setup

In an example experimental setup, the dataset is composed of 120,000 domains randomly selected from Alexa top 1M (see Alexa Internet, available at alexa.com) and 1,020 DDGA generated domain names. To generate the latter, we used a reverse engineered version of the DDGA Suppobox (see J. Bader, Domain Generation Algorithms, 2015, available at https://github.com/baderj/domain_generation_algorithms/tree/master/suppobox). The code includes three different wordlists/dictionaries (WL1, WL2, WL3) for domain generation.

In this example experimental setup, we compare our example model implementation to a traditional supervised machine learning method—Random Forests. We now describe the dataset used for training. For each available dictionary, we generated 340 domains. We work with three rounds of training and testing, as described in Table 1. In each round, we train the model using DGA domains generated with dictionaries that are independent from the dictionaries used in the generation of the DGA domains in the test dataset. The purpose is to verify the ability of the disclosed model to detect dictionaries that it has not seen before.

In the case of our solution, as it is unsupervised, we presented solely the Test Data as described in Table 1.

TABLE 1

Dataset Description

| Dataset | Train | | | | Test | | | |
|---------|-------|-----|-----|-----|-------|-----|-----|-----|
|         | Alexa | WL1 | WL2 | WL3 | Alexa | WL1 | WL2 | WL3 |
| Round 1 | 80,000 | 340 | 340 | 0 | 40,000 | 0 | 0 | 340 |
| Round 2 | 80,000 | 0 | 340 | 340 | 40,000 | 340 | 0 | 0 |
| Round 3 | 80,000 | 340 | 0 | 340 | 40,000 | 0 | 340 | 0 |

Accuracy of the Dictionary Extraction

We first show in Table 2 how much of the original dictionaries our techniques could recover.

TABLE 2

Analysis of Word Detection

| Wordlist | # of detected words (total) | Recall | FPR |
|----------|----------------------------|--------|-----|
| WL1 | 92 (92) | 1 | 0 |
| WL2 | 64 (70) | 0.91 | 0 |
| WL3 | 80 (80) | 1 | 0 |

Domain Detection

Once a dictionary is extracted, we use its words to build a simple classifier: a domain is labeled as DDGA if it has two or more words from the dictionary. Table 3 compares our classifier with a Random Forest (RF) with 100 trees, trained on the following 11 features, extracted from each domain name string (see B. Yu, L. Smith, and M. Threefoot. Semi-Supervised Time Series Modeling for Real-Time Flux Domain Detection on Passive DNS Traffic, Proc. of the 10th International Conference on Machine Learning and Data Mining, pages 258-271, 2014 and B. Yu, L. Smith, M. Threefoot, and F. Olumofin, Behavior Analysis based DNS Tunneling Detection with Big Data Technologies, Proc. of the International Conference on Internet of Things and Big Data, pages 284-290, 2016): ent (normalized entropy of characters); nl2 (median of 2-gram); nl3 (median of 3-gram); naz (symbol character ratio); hex (hex character ratio); vwl (vowel character ratio); len (domain label length); gni (gini index of characters); cer (classification error of characters); tld (top level domain hash); dgt (first character digit). We can clearly see that the Random Forest cannot classify correctly domains if they come from a dictionary that has not been presented to it in advance.

TABLE 3

Average across Models

| Model | Precision | Recall | FPR |
|-------|-----------|--------|-----|
| Our Model | 1 | 0.99 | 0 |
| RF | 0.028 | 0.005 | 0.001 |

Accordingly, the disclosed graph-based DDGA detection techniques provide a novel solution for automatic detection of domains generated by a Wordlist-based DGA (e.g., DDGA). Instead of using a traditional character probability distribution approach for pattern finding among NXDOMAIN traffic, the disclosed techniques automatically determine intersections between domains in order to identify domains that are potentially formed by words that come from a same wordlist/dictionary, in this specific case, domains that are generated by a Wordlist-based DGA (e.g., DDGA). The disclosed graph-based DDGA detection techniques also generate the set of words (e.g., malicious dictionary) used by a dictionary DGA without the need for reverse engineering.

As further described below, the disclosed graph-based DDGA detection techniques have been implemented and tested against several days of data from DNS traffic. For example, the disclosed graph-based DDGA detection techniques were able to detect in an unsupervised and automatic way various DDGA malware families—their domains and the respective wordlists/dictionaries. The results were validated by cross-checking using the malware database DGArchive (see D. Plohmann, K. Yakdan, M. Klatt, J. Bader, and E. Gerhards-Padilla, A Comprehensive Measurement Study of Domain Generating Malware, 25th USENIX Security Symposium (USENIX Security 16), pages 263-278, Austin, Tex., 2016).

Various system and process embodiments for performing the disclosed graph-based DDGA detection techniques will now be further described below.

Overview of a System and a System Architecture for Performing Detection of Algorithmically Generated Domains Based on a Dictionary FIG. 1 is a diagram of a system architecture for detection of algorithmically generated domains based on a dictionary in accordance with some embodiments. FIG. 1 illustrates a multi-stage automated DGA analysis system can be deployed for identification of malicious dictionaries associated with DDGAs. Specifically, the multi-stage automated DGA analysis system can be used to perform the disclosed techniques for automatic detection of algorithmically generated domains based on a dictionary among DNS traffic (e.g., daily DNS traffic) and an associated malicious dictionary. As similarly discussed above, given that DDGAs generally generate domains from a relatively small set of words (e.g., about 30 to 200 words per day) with a high reuse rate of words, the disclosed system facilitates an automated analysis of the behavior of domains in daily DNS traffic according to a word intersection between domains.

Referring to FIG. 1, NXDOMAINS 102 are received at a first stage 104. At the first stage, the received NXDOMAINS (e.g., one day of observed NXDOMAIN traffic or some other period/set of NXDOMAIN traffic) are filtered using a filter 106 into one or more of the following: traditional DGAs 108, noise—other domains 110, and natural language related domains 112. For example, the NXDOMAIN traffic can be filtered using a classifier that uses a list of lexical features to classify NXDOMAINS based on whether such include natural language content or not based on a supervised machine learning algorithm (e.g., the classifier can be trained using a large data set of observed NXDOMAIN traffic, such as 500,000 to 1 million or more NXDOMAIN results in the data set, in which the domains can be labeled using an automated dictionary matching analysis) as further described below. The natural language related domains (112) are output to an optional second stage 114.

At the second stage (e.g., an optional clustering stage that is not performed in other embodiments, such that the natural language related domains (112) are output directly to the third stage as further described below), the natural language related domains (112) are clustered using a clustering component 116. For example, the clustering of the natural language related domains (112) can be performed using various clustering techniques based on lexical structure (e.g., grouping the NXDOMAINS by top-level domain, presence of numeric characters, and presence of special characters) as further described below. The results of the optional clustering stage are output to a third stage 118. In other embodiments, the second stage is optional, and the clustering component can be omitted from these other system embodiments.

At the third stage, the grouped NXDOMAINS (e.g., clusters of NXDOMAINS) received from the clustering stage are graphed into word graphs as shown at 120. For example, the grouped NXDOMAINS received from the clustering stage can be graphed into word graphs for detecting malicious dictionaries/vocabularies 122 using automated graph-based analysis techniques as further described below. As such, the NXDOMAINS can be filtered, classified, and graphed to perform word detection to facilitate detection of malicious dictionaries/vocabularies based on word graph connections as further described below. In other embodiments, the second stage is optional as mentioned above, and the clustering component can be omitted from these other system embodiments, such that the natural language related domains (112) are output directly to the third/subsequent stage for performing the disclosed word graph operations for generating the word graphs to detect malicious vocabularies using automated graph-based analysis techniques as further described below. At 124, the output from the third stage includes malicious dictionaries/vocabularies 122 to be utilized for detecting C&C activity (e.g., detecting DDGA malware and DDGA related DNS activities on an enterprise network, including botnet C&C proxy detection, as further discussed below).

In some embodiments, the disclosed graph-based techniques are performed to detect groups of NXDOMAINS that are formed by the same vocabulary/dictionary (e.g., a set of words/natural language content, such as further described below) to facilitate identification of NXDOMAINS that are generated by the same DDGA (e.g., the same DDGA or the same DDGA family). The result of the graph analysis is a list of NXDOMAINS that 'connect' by having word intersections and also the list of words that represent such intersections. The malicious vocabulary/dictionary detected from observed NXDOMAIN traffic can be applied for botnet C&C proxy detection. For example, IP addresses associated with potentially malicious DDGA generated domains determined to be associated with a malicious vocabulary/dictionary may also be further investigated (e.g., for potential blacklisting and/or other remedial actions based upon further investigation/verification of the IP addresses associated with potentially malicious DDGA generated domains).

In an example implementation, the system architecture for detection of algorithmically generated domains based on a dictionary can be implemented in software executed on an appliance/server (e.g., implemented using server class hardware or a virtual server), such as a DNS/security appliance/server.

Figure 2:
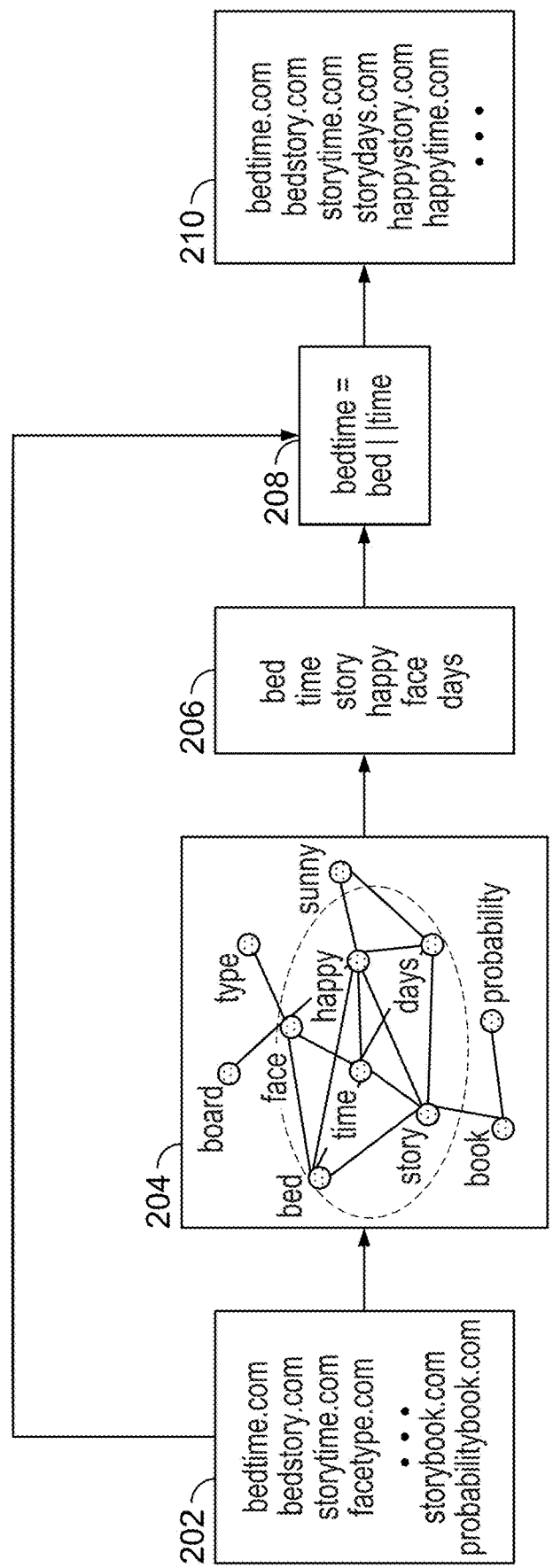
FIG. 2 is an example flow of operations using graph-based analysis performed by a system for detection of algorithmically generated domains based on a dictionary in accordance with some embodiments.

FIG. 2 is an example flow of operations using graph-based analysis performed by a system for detection of algorithmically generated domains based on a dictionary in accordance with some embodiments. Specifically, FIG. 2 illustrates an example flow of operations performed during the third stage of processing (e.g., shown at 118 in FIG. 1) of an automated DGA analysis system that can be deployed for identification of malicious dictionaries associated with DDGAs. As similarly described above, the multi-stage automated DGA analysis system can be used to perform the disclosed techniques for automatic detection of algorithmically generated domains based on a dictionary among DNS traffic (e.g., daily DNS traffic) and an associated malicious dictionary. As also similarly discussed above, given that DDGAs generally generate domains from a relatively small set of words (e.g., about 30 to 200 words per day) with a high reuse rate of words, the disclosed system facilitates an automated analysis of the behavior of domains in daily DNS traffic according to a word intersection between domains.

In some embodiments, the system includes three major operations. In an example implementation, these operations are performed on a set of observed DNS traffic (e.g., a single day of DNS traffic or some other set of DNS traffic, which includes NXDOMAIN related DNS traffic). First, filtering of natural language related domains using a classifier based on semi-supervised/unsupervised machine learning techniques is performed. For example, a list of lexical features can be used to classify an NXDOMAIN as containing natural language related content or not (e.g., the classifier model can be trained using a large set of observed NXDOMAIN traffic and the domains can be labeled by using a dictionary matching algorithm as further described below). In an optional second stage as noted above, clustering of natural language related domains based on lexical structure is performed. For example, this operation can group/cluster domains by top-level domain, presence of numeric characters, and presence of special characters. In a subsequent/third stage, a graph-based analysis for detecting malicious dictionaries is performed. For example, this operation can apply the graph-based analysis in each of the resulting clusters from the previous clustering operation. Each of these operations and associated components will now be further described below.

Components of the System and Interactions of the Components

In some embodiments, the disclosed techniques can be performed to identify domains generated by DDGAs and the associated malicious dictionary using DNS traffic (e.g., using batches of daily observed DNS traffic including NXDOMAIN traffic, in which the DNS traffic data can be pre-filtered to provide only NXDOMAIN associated DNS traffic data as input to the first operation/stage). At a first operation performed using a classifier, NXDOMAINS that include natural language content (e.g., words, names, or other natural language content) are identified. At an optional second operation performed using a clustering component, the resulting group of natural language related NXDOMAINS are clustered to aggregate NXDOMAINS that have similar structure (e.g., top-level domain, presence of numeric characters, presence of special characters, etc.). For example, this second operation can improve the quality of the dictionary detection, which is the next operation, by providing a more homogeneous set of NXDOMAINS, and reducing possible noisy intersections, which are provided as input into the third operation. At the third operation performed using a graph analyzer component, an automated graph analysis of the relationships between the set of NXDOMAINS is performed (e.g., in this example, connecting domains corresponding to any two domains that present a string/word intersection, such as further described below). The graph analysis is performed to identify connected components of domains (e.g., using community detection techniques as further described below). The result of the graph analysis is a list of DDGA domains and their associated malicious dictionaries.

Referring to FIG. 2, a set of NXDOMAINS (e.g., the grouped NXDOMAINS, such as clusters of NXDOMAINS as similarly described above with respect to FIG. 1) is received at 202. The set of NXDOMAINS are graphed into word graphs as shown at 204. For example, the grouped NXDOMAINS (e.g., received from the filtering stage or the optional clustering stage as similarly described above with respect to FIG. 1) can be graphed into word graphs for detecting malicious dictionaries/vocabularies using automated graph-based analysis techniques as further described below. In an example implementation, the nodes of the graph correspond to individual words extracted from each of the NXDOMAIN results, in which each of the nodes are connected to another node with an edge if each of the respective nodes/words appear in one of the NXDOMAIN results, such as the node for "bed" and the node for "story" as both appear in the NXDOMAIN result of "bedtime.com". As such, the NXDOMAINS can be filtered, classified, and graphed to perform unsupervised word detection and domain segmentation to facilitate detection of malicious dictionaries/vocabularies based on word graph connections as further described below.

In some embodiments, the disclosed graph-based techniques are performed to detect groups of NXDOMAINS that are formed by the same vocabulary/dictionary (e.g., a set of words/natural language content) to facilitate identification of NXDOMAINS that are generated by the same DDGA (e.g., the same DDGA or the same DDGA family). For example, the nodes/words that have edges with a threshold number of other nodes/words (e.g., two, three, or a higher threshold number of edges) are detected. In this example, a threshold of three is applied to generate a subset of words as shown at 206 (e.g., each of these nodes has at least three associated edges). As such, the result of the graph analysis is a list of NXDOMAINS that 'connect' by having word intersections and also the list of words that represent such intersections. For example the words "bed" and "time" each have at least three edges and are connected to each other with an edge due to the NXDOMAIN result of "bedtime.com" as shown at 208. The malicious vocabulary/dictionary detected from observed NXDOMAIN traffic can be applied for botnet C&C proxy detection based on potential combinations of such words (e.g., concatenating two or more of these words) as shown at 210 (e.g., bedtime.com, bedstory.com, storytime.com, storydays.com, happystory.com, happytime.com, etc.). For example, IP addresses associated with potentially malicious domains determined to be associated with a malicious vocabulary/dictionary may also be further investigated (e.g., for potential blacklisting and/or other remedial actions based upon further investigation/verification of the IP addresses associated with potentially malicious domains).

Example traditional DGA generated domains produced from random seeds are provided below.

svbrinclnw.ru.
tjfvfvdgjxhfy.com.
ui-0x00199d.com.
wyqjlxitnv.ru.
zdpyu.biz.
zfxsut.net
bjgvljqby.com.
jkxxjedhej.net.
jmsckybbtiwrdt4.com.
zbaqvkknoikvscjzco.com.
zzyynjueqowwguj6g.com.

Example Dictionary DGA (DDGA) generated domains produced from dictionary words (e.g., two concatenated words and three concatenated words, respectively) are provided below.

facegone.net.
walkroad.net.
weakdont.net.
sellfool.net.

weakheat.net.
deepaunt.net.
facethey.net.
ballpull.net.
pushaunt.net.
walklift.net.
bothfive.net.
facegoes.net.

mastermanmerrickson.net.
laurenciamichaelson.net.
jacquelynchristophers.net.
gweneverchristison.net.
christianchristianson.net.
rosalynnemottershead.net.
creightonthaddeus.net.
jacquelynjeremiah.net.
creightonnathaniel.net.
priscilladwerryhouse.net.
christinajeremiah.net.
kassandraterrence.net.

Note that if one changes the dictionary, previously trained DGA detection classifiers will not be able to effectively detect such DDGA using the modified/new dictionaries. The probability distributions of lexical features of benign domains versus the probability distributions of lexical features of malicious domains are an example of an existing approach used to detect DGAs. However, the probability distribution of lexical features in the case of dictionary DGAs is more similar to that of the English language. As a result, such existing approaches do not perform effectively for DDGAs as similarly discussed above.

Identifying a Malicious Dictionary (Vocabulary) Used by DDGA

Figure 3:
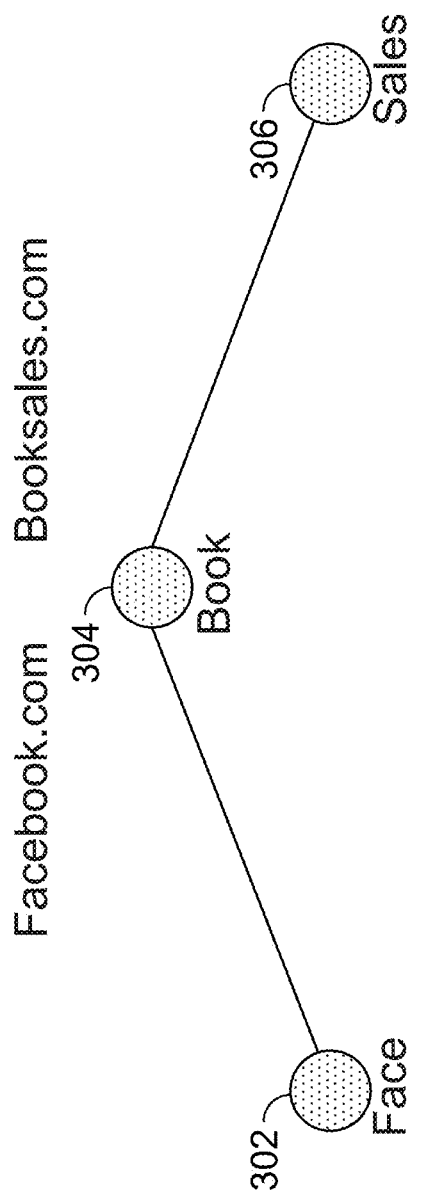
FIG. 3 is a word graph generated using the graph-based analysis performed by the system for detection of algorithmically generated domains based on a dictionary in accordance with some embodiments.

FIG. 3 is a word graph generated using the graph-based analysis performed by the system for detection of algorithmically generated domains based on a dictionary in accordance with some embodiments. For example, the example word graph can be generated using the graph-based analysis performed by the system for detection of algorithmically generated domains based on a dictionary as similarly described above with respect to FIGS. 1 and 2.

DDGAs generally select words from a malicious dictionary (e.g., vocabulary associated with a given DDGA/DDGA family, which may include actual words, names, typographical errors, non-words, and/or other natural language content/strings, etc.). Generally, DDGAs pseudo-randomly select words from their malicious dictionary, and the words from their malicious dictionary are typically reused.

Referring to FIG. 3, a set of domains, which includes facebook.com and booksales.com in this example, can be graphed into word graphs for detecting malicious dictionaries/vocabularies using automated graph-based analysis techniques as further described below. In an example implementation, the nodes of the graph correspond to individual words extracted from each of the domains, in which each of the nodes are connected to another node with an edge if each of the respective nodes/words appear in one of the domains, such as the node for "face" shown at 302 and the node for "book" shown at 304 as both appear in "facebook.com" and similarly the node for "sales" shown at 306 and the node for "book" shown at 304 as both appear in "booksales.com".

Figure 4A:
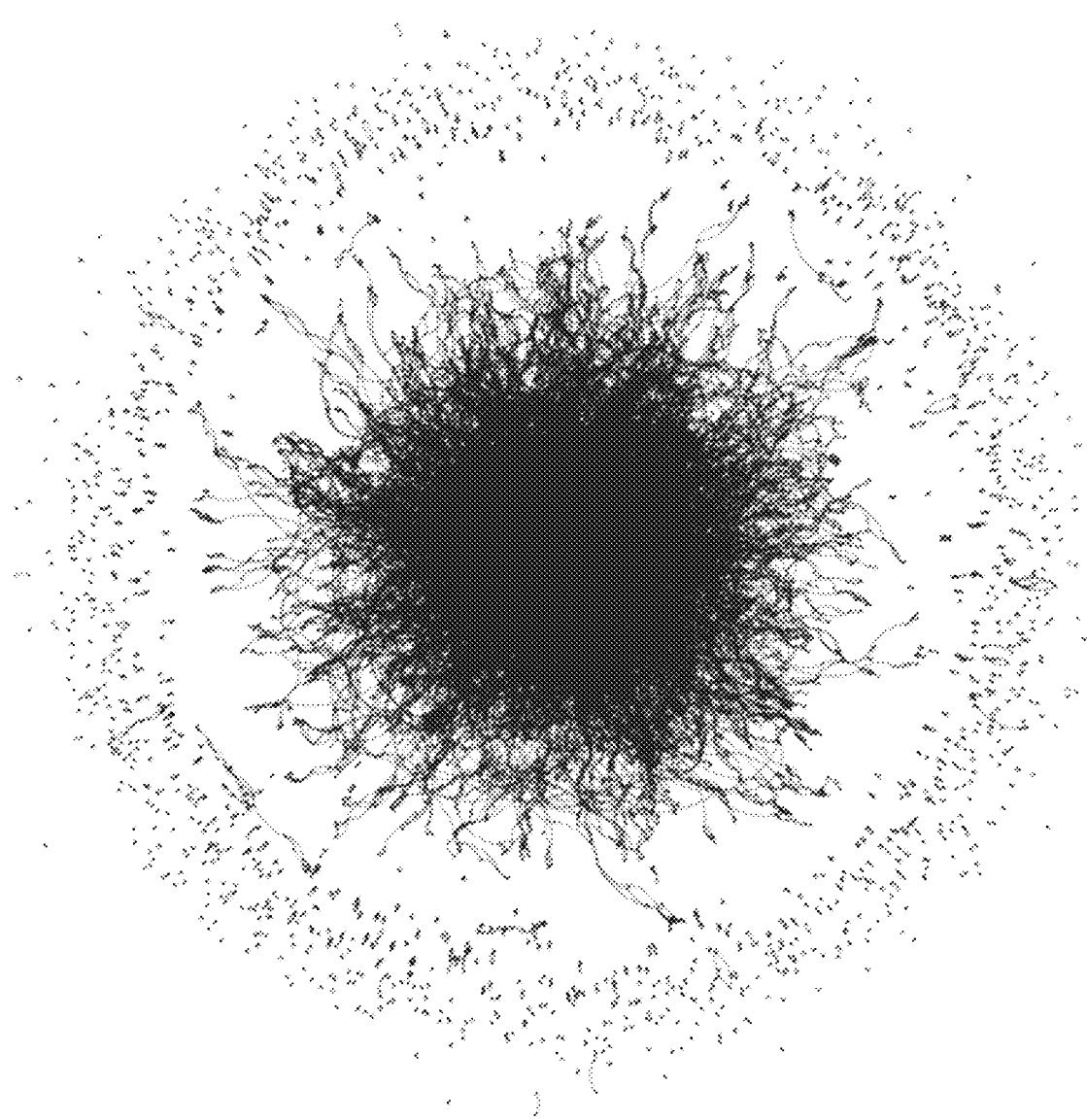
FIG. 4A is an example graph of words for legitimate domains in accordance with some embodiments.

FIG. 4A is an example graph of words for legitimate domains in accordance with some embodiments. Specifically, FIG. 4A is a word graph generated by using Alexa top 10,000 domains.

Figure 4B:
FIG. 4B is an example graph of words for DDGAs in accordance with some embodiments.

FIG. 4B is an example graph of words for DDGAs in accordance with some embodiments. Specifically, FIG. 4B is a word graph generated by using 4,000 domains generated by a DDGA malware family.

Figure 5:
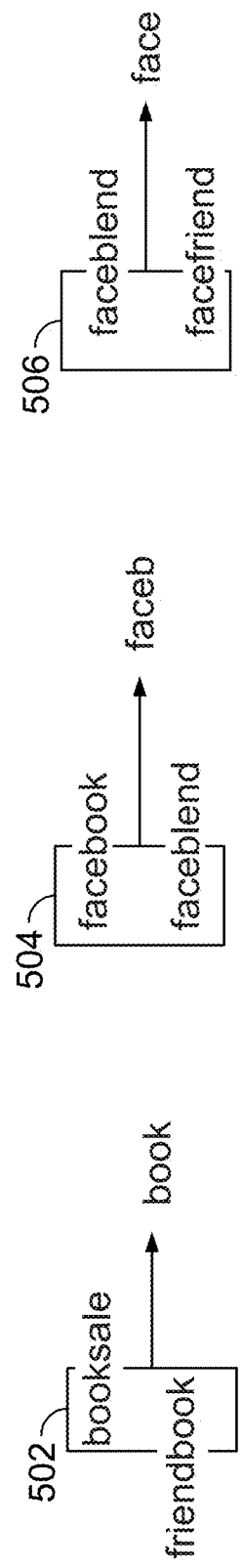
FIG. 5 is a word detector performed by the system for detection of algorithmically generated domains based on a dictionary in accordance with some embodiments.

FIG. 5 is a word detector performed by the system for detection of algorithmically generated domains based on a dictionary in accordance with some embodiments. For example, the example word detector can be performed by the system for detection of algorithmically generated domains based on a dictionary as similarly described above with respect to FIGS. 1 and 2.

In some embodiments, a word detector performs unsupervised word finding that learns to identify the common "word candidates" among a list of collected domains (e.g., identifies common words among a set of NXDOMAINs or other set of domains). Specifically, the word detector extracts a largest common substring (e.g., some may be words and some may not be words, that is, may not be present in an English dictionary or dictionaries for other languages, such as names of persons, places, typographical errors, and/or other strings). As discussed above, DDGAs generally utilize a dictionary (e.g., also referred to herein as a malicious dictionary, wordlist, or vocabulary) that can include hundreds to thousands (or a greater number) of words used to then generate domains.

Referring to FIG. 5, assume that an input to the word detector includes the following two domains, "booksale.com" and "friendbook.com". At 502, the word detector extracts the largest common substring, which is "book". Assume that another input to the word detector includes the following two domains, "facebook.com" and "faceblend.com". At 504, the word detector extracts the largest common substring, which is "faceb". Assume that another input to the word detector includes the following two domains, "faceblend.com" and "facefriend.com". At 506, the word detector extracts the largest common substring, which is "face".

Figure 6:
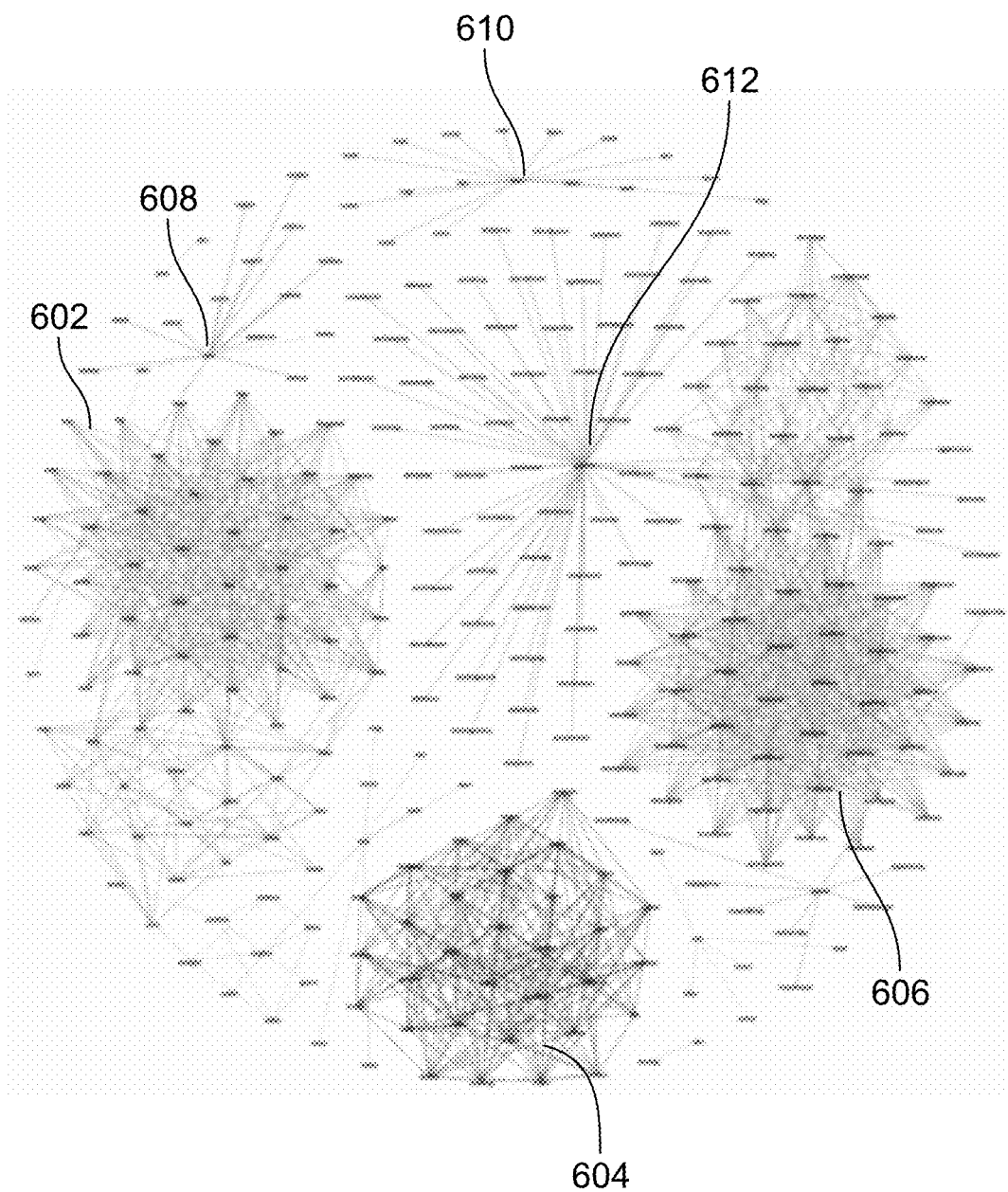
FIG. 6 is an example graph of words for a set of NXDOMAIN traffic in accordance with some embodiments.

FIG. 6 is an example graph of words for a set of NXDOMAIN traffic in accordance with some embodiments. For example, the example word graph can be generated using the word detector performed by the system for detection of algorithmically generated domains based on a dictionary as similarly described above with respect to FIGS. 1 and 2.

As discussed above, the word graph analysis techniques can be performed to determine graph connected components of real words that are connected in the word graph. Referring to FIG. 6, example connected components in the word graph are shown at 602, 604, and 606.

As such, malicious dictionaries can be determined using these word graph-based analysis techniques to extract word candidates from the domains based on the clusters that can be identified in the word graph, such as shown at 602, 604, and 606 in FIG. 6. In an example implementation, instead of performing a brute force pairwise comparison of all domains (e.g., NXDOMAINs), an optimized domain analysis can be performed using initial word candidates by looking at a first n number of characters and a last n number of characters (e.g., four or some other number of characters), which is based on an observed practice of DDGAs reusing words at the beginning and end of domains. Also, for DDGAs that utilize/concatenate a combination of three or more from their dictionaries to generate each domain, then such DDGAs will typically reuse each of the words that are sometimes used for a middle word in the domain to be used for a first word or last word in generated domains. As such, the above-described techniques for analyzing for word candidates at the beginning or end would still effectively identify word candidates for generating the word graphs as described herein.

As also shown in FIG. 6, applying a threshold of graph interconnections in a cluster (e.g., every member has an example threshold of three or more edges) can be applied to identify connected components of interest for detecting and extracting malicious dictionaries for DDGAs.

As further described below, the above-described graph-based techniques can be applied to identify the malicious dictionaries used by DDGAs.

Example dictionaries detected and extracted from the example DNS domain data set using the above-described graph-based techniques are provided below.

Dictionary 1

Dike, 'liar', 'scene', 'aunt', 'fire', 'news', 'whole', 'fifty', 'threw', 'king', 'grave', 'learn', 'ring', 'wrote', 'much', 'mile', 'west', 'loud', 'shade', 'sense', 'sorry', 'bone', 'plant', 'mark', 'usual', 'cross', 'thousand', 'rise', 'point', 'fall', 'broke', 'table', 'saturday', 'very', 'floor', 'than', 'stock', 'cold', 'Irstn', 'state', 'call', 'reply', 'favor', 'their', 'piece', 'nose', 'throw', 'read', 'take', 'pull', 'tries', 'noise', 'tree', 'none', 'well', 'fruit', 'could', 'dont', 'tore', 'fear', 'great', 'teach', 'lead']

Dictionary 2

['family', 'airplane', 'children', 'fence', 'either', 'guard', 'straight', 'english']

Dictionary 3

['forest', 'measure', 'fellow', 'dinner', 'strength', 'apple', 'desire', 'anger', 'store', 'broken', 'carry', 'control', 'still', 'double', 'prepare', 'wheat', 'might', 'evening', 'outside', 'built', 'afraid', 'movement', 'result', 'always', 'pretty', 'together', 'circle', 'spent', 'doctor', 'father', 'matter', 'building']

Disconnected components of word graph 1 are shown below.

['ip-uper', 'fbol', 'ffof', 'fbop', 'fpor', 'az-ocef', 'ep-ylok', 'flof', 'fpof', 'fjor', 'eb-abif', 'oj-alef', 'ffop', 'ek-oder', 'ik-ibol', 'if-imif']

Disconnected components of word graph 2 are shown below.

['fbyf', 'ok-ipip', 'ip-esib', 'yf-ofop', 'fbyp', 'al-opyp', 'fnyp', 'on-udav', 'in-okuj', 'er-uvuj', 'al-uhib', 'fvyb', 'fpyh', 'ffyx', 'fpyv', 'eb-yxav', 'ffyj']

Disconnected components of word graph 3 are shown below.

['uk-ydop', 'il-ucup', 'ffuj', 'fbut', 'er-abev', 'fpur']

Disconnected components of word graph 4 are shown below.

['ek-eben', 'ffev', 'fnep', 'ar-ifeb', 'fbef', 'fhef', 'ip-olen', 'uv-ypeb', 'fper', 'flet', 'or-alin', 'ftep', 'yb-ikav', 'ep-apuv', 'fbev', 'et-odib', 'yk-ivib', 'ab-ugin', 'fnem', 'fpev', 'fbel', 'uf-erin', 'af-yvot', 'flep', 'un-ateb', 'fvev']

Moreover, the disclosed DDGA detection techniques are effective based solely on the collected domains (no need for collecting the IP addresses of clients) as discussed above. Also, the disclosed DDGA detection techniques are effective even when such are a relatively small portion of the observed NXDOMAIN traffic. Further, the disclosed DDGA detection techniques are agnostic to language and have been performed to successfully identify several DGA families in real, observed NXDOMAIN traffic.

Figure 7:
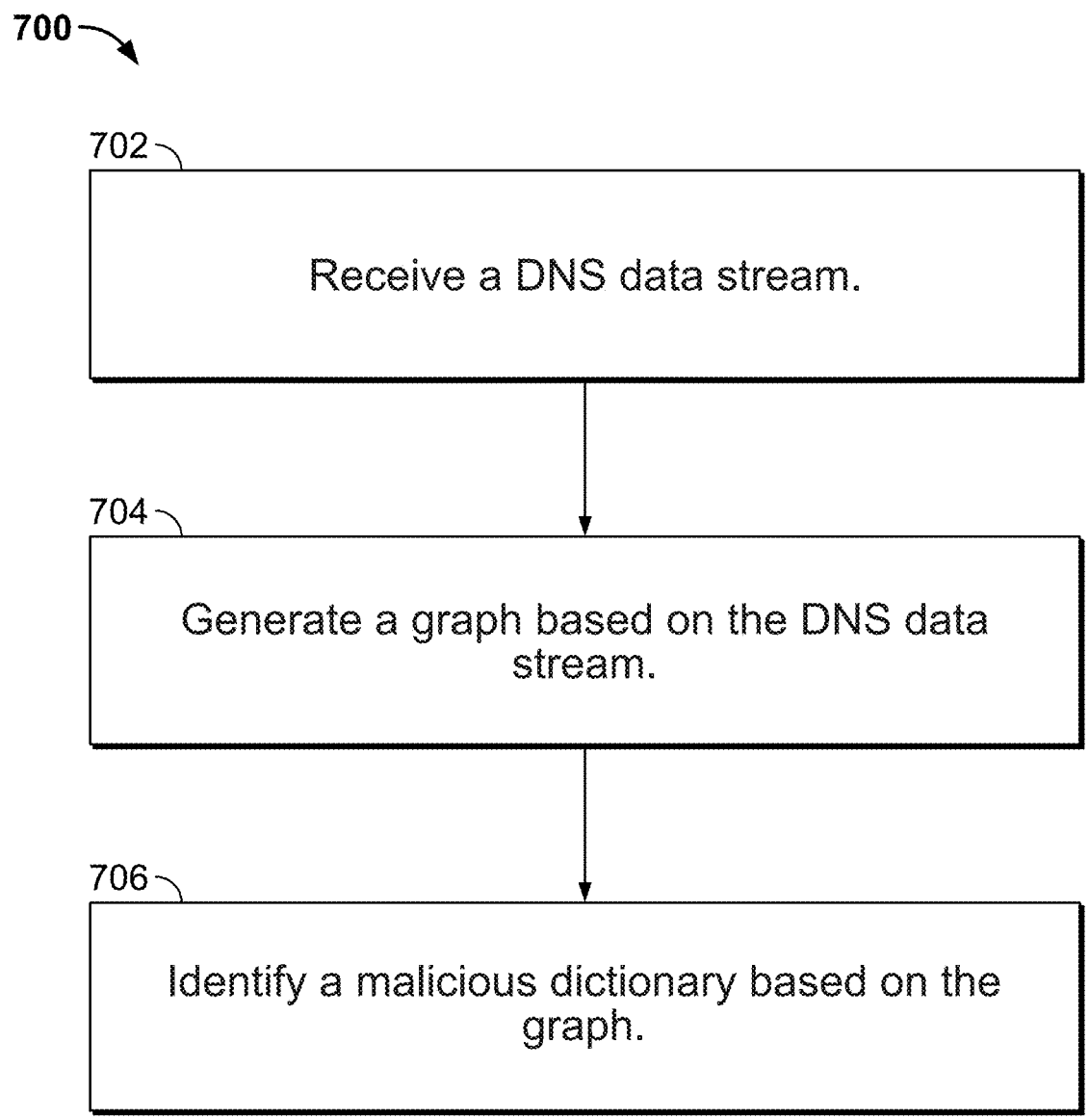
FIG. 7 is a flow diagram illustrating a process for detection of algorithmically generated domains based on a dictionary in accordance with some embodiments.

Example Processes for Detection of Algorithmically Generated Domains Based on a Dictionary FIG. 7 is a flow diagram illustrating a process for detection of algorithmically generated domains based on a dictionary in accordance with some embodiments. In various embodiments, process 700 is performed by the system(s) and techniques described above with respect to FIGS. 1 through 6.

At 702, a DNS data stream is received. For example, the DNS data stream can include a DNS query and a DNS response for resolution of the DNS query. As described above, the DNS data stream can include NXDOMAIN traffic (e.g., pre-filtered or subsequently filtered to only include NXDOMAIN traffic).

At 704, generating a graph based on the DNS data stream is performed. For example, various techniques are disclosed for implementing graph-based techniques as described above (e.g., word graph-based techniques).

At 706, identifying a malicious dictionary based on the graph is performed. For example, a malicious dictionary associated with a DDGA can be extracted based on a neighborhood/cluster identified in the graph as similarly described above.

Figure 8:
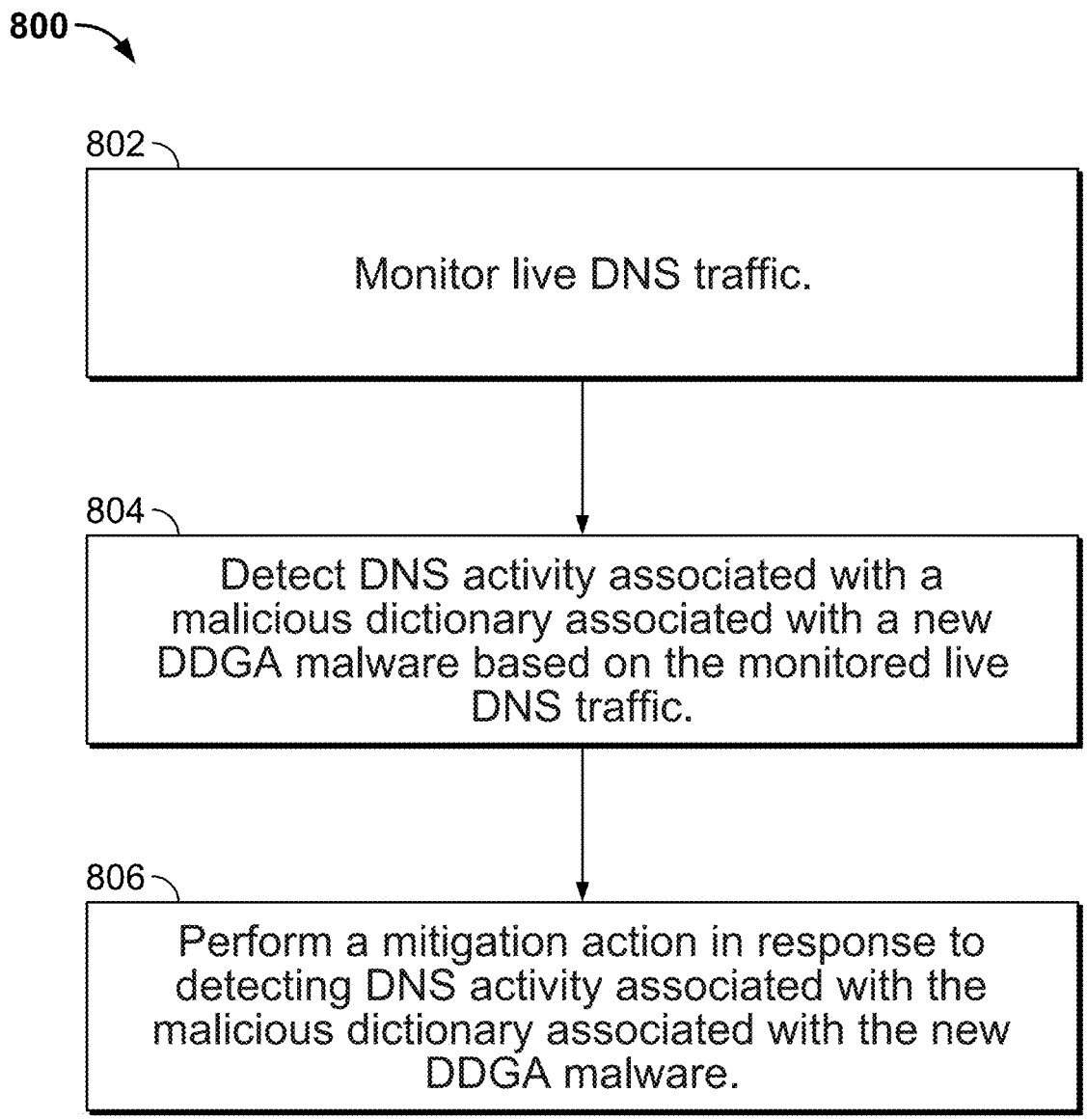
FIG. 8 is another flow diagram illustrating a process for detection of algorithmically generated domains based on a dictionary in accordance with some embodiments.

FIG. 8 is another flow diagram illustrating a process for detection of algorithmically generated domains based on a dictionary in accordance with some embodiments. In various embodiments, process 800 is performed by the system(s) and techniques described above with respect to FIGS. 1 through 6.

At 802, live DNS traffic is monitored. For example, the actual, live DNS traffic that is monitored can include resolved and unresolved DNS query results.

At 804, detecting DNS activity associated with a malicious dictionary associated with a new DDGA malware based on the monitored live DNS traffic is performed. For example, various techniques are disclosed for detecting DNS activity associated with a malicious dictionary associated with a new DDGA malware based on the monitored real, live DNS traffic.

At 806, a mitigation action is performed in response to detecting DNS activity associated with the malicious dictionary associated with the new DDGA malware. For example, the mitigation action can include a configuration action and/or a filtering action (e.g., block or drop packets to/from the bad/malware network domain and/or bad/malware IP address associated with the potentially malicious network domain). As another example, the mitigation action can include configuring a network device (e.g., a switch or router, implemented as a physical or virtual switch/router) to quarantine the infected host and/or block access to the bad network domain and/or bad IP address associated with DNS tunneling activity, using network access control or other mechanisms to quarantine the infected host and/or block access to the bad network domain and/or bad IP address, configuring a security device controller using Open Flow techniques to configure a network device (e.g., a switch or router, implemented as a physical or virtual switch/router) to quarantine the infected host and/or block access to the bad network domain and/or bad IP address, and/or to implement other configuration/programming techniques such as via API or publish/subscribe mechanisms to configure a network device (e.g., a switch or router, implemented as a physical or virtual switch/router) to quarantine the infected host and/or block access to the bad network domain and/or bad IP address.

As shown in FIGS. 9A and 9B is an example of how the disclosed techniques can automatically analyze such example DDGA generated domains to determine that such are DDGA generated domains and extract the dictionary being used by the DDGA. In the example as shown in FIGS. 9A and 9B, words that appear at the beginning or end of the domain that are present in two or more domains are identified as shown in the below example (e.g., which reduces the computational complexity of a brute force pairwise comparison of domains, for a sample set of 500,000 to 1 million domains, which is reduced after filtering as described herein by approximately 40%, which can reduce processing time for such analysis of the remaining domains to approximately 5 minutes in comparison with an order of hours of processing time for performing a brute force pairwise comparison of the remaining domains, performed using server class computing hardware in this example).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a DNS data stream, wherein the DNS data stream includes a DNS query and a DNS response for resolution of the DNS query;
generate a graph based on the DNS data stream, comprising:
extracting a set of words from natural language related domains in the DNS data stream, wherein each word in the set of words has at least 3 characters;
splitting the natural language related domains into a plurality of sets, wherein each natural language related domain of at least one set of the plurality of sets has different domains, and wherein all of the natural language related domains of the at least one set have the same top-level domain; and
obtaining the graph from the at least one set of the plurality of sets, wherein two words of the graph are connected in the event that the two words co-occur in the same one set; and
identify a malicious dictionary based on the graph; and
a memory coupled to the processor and configured to provide the processor with instructions.

2. The system recited in claim 1, wherein the DNS data stream is a live DNS data stream.

3. The system recited in claim 1, wherein the DNS data stream includes NXDOMAIN traffic.

4. The system recited in claim 1, wherein the DNS data stream is automatically filtered to identify the natural language related domains included in the DNS data stream.

5. The system recited in claim 1, wherein the DNS data stream is automatically filtered to identify the natural language related domains included in the DNS data stream using a classifier.

6. The system recited in claim 1, wherein the DNS data stream is automatically filtered to remove domains associated with traditional DGA malware.

7. The system recited in claim 1, wherein the processor is further configured to:
filter the DNS data stream, wherein the DNS data stream is automatically filtered using a classifier to identify the natural language related domains included in the DNS data stream; and
output the filtered DNS data stream for generating the graph using the identified natural language related domains included in the DNS data stream.

8. The system recited in claim 1, wherein the processor is further configured to:
filter the DNS data stream, wherein the DNS data stream is automatically filtered using a classifier to identify the natural language related domains included in the DNS data stream; and
output the filtered DNS data stream for clustering the identified natural language related domains included in the DNS data stream prior to generating the graph based on the DNS data stream.

9. The system recited in claim 1, wherein the processor is further configured to:
detect command and control botnet related activity based on the malicious dictionary.

10. A method, comprising:
receiving a DNS data stream, wherein the DNS data stream includes a DNS query and a DNS response for resolution of the DNS query;
generating a graph based on the DNS data stream, comprising:
extracting a set of words from natural language related domains in the DNS data stream, wherein each word in the set of words has at least 3 characters;
splitting the natural language related domains into a plurality of sets, wherein each natural language related domain of at least one set of the plurality of sets has different domains, and wherein all of the natural language related domains of the at least one set have the same top-level domain; and
obtaining the graph from the at least one set of the plurality of sets, wherein two words of the graph are connected in the event that the two words co-occur in the same one set; and
identifying a malicious dictionary based on the graph.

11. The method of claim 10, wherein the DNS data stream is a live DNS data stream.

12. The method of claim 10, wherein the DNS data stream includes NXDOMAIN traffic.

13. The method of claim 10, wherein the DNS data stream is automatically filtered to identify the natural language related domains included in the DNS data stream.

14. The method of claim 10, wherein the DNS data stream is automatically filtered to identify the natural language related domains included in the DNS data stream using a classifier.

15. The method of claim 10, wherein the DNS data stream is automatically filtered to remove domains associated with traditional DGA malware.

16. A computer program product, the computer program product being embodied in a tangible non-transitory computer readable storage medium and comprising computer instructions for:
receiving a DNS data stream, wherein the DNS data stream includes a DNS query and a DNS response for resolution of the DNS query;
generating a graph based on the DNS data stream, comprising:

extracting a set of words from natural language related domains in the DNS data stream, wherein each word in the set of words has at least 3 characters;

splitting the natural language related domains into a plurality of sets, wherein each natural language related domain of at least one set of the plurality of sets has different domains, and wherein all of the natural language related domains of the at least one set have the same top-level domain; and obtaining the graph from the at least one set of the plurality of sets, wherein two words of the graph are connected in the event that the two words co-occur in the same one set; and identifying a malicious dictionary based on the graph.

17. The computer program product recited in claim 16, wherein the DNS data stream is a live DNS data stream.

18. The computer program product recited in claim 16, wherein the DNS data stream includes NXDOMAIN traffic.

19. The computer program product recited in claim 16, wherein the DNS data stream is automatically filtered to identify the natural language related domains included in the DNS data stream.

20. The computer program product recited in claim 16, wherein the DNS data stream is automatically filtered to identify the natural language related domains included in the DNS data stream using a classifier.

* * * * *

UNITED STATES PATENT AND TRADEMARK OFFICE
CERTIFICATE OF CORRECTION

PATENT NO. : 11,025,648 B2
APPLICATION NO. : 15/967346
DATED : June 1, 2021
INVENTOR(S) : Mayana Pereira, Vadym Tymchenko and Bin Yu It is certified that error appears in the above-identified patent and that said Letters Patent is hereby corrected as shown below:

On the Title Page

Column 2, item (56), other publications, cite no. 3, delete "Antonaikakis et al.," and insert --Antonakakis et al.,--, therefor.

In the Specification

In Column 8, Line(s) 24, after "add", insert --$1_{i,j}$--.

In Column 8, Line(s) 25, delete "1)" and insert --D--, therefor.

In Column 8, Line(s) 67, after "graph", insert --$G_i$,--.

In Column 9, Line(s) 1, delete "$G_i=(\mathcal{N},,\mathcal{L}),$" and insert --$G_i = (\mathcal{N}, \mathcal{L})$,--, therefor.

In Column 9, Line(s) 3, delete "$=|\mathcal{N},|$," and insert --$=|\mathcal{N}|$--, therefor.

In Column 9, Line(s) 4, delete "$x\varepsilon\,\mathcal{N},.$" and insert --$x \varepsilon \mathcal{N}$.--, therefor.

In Column 9, Line(s) 6, delete "$(\text{mean}(d(x)), \text{ for } x\varepsilon\,\mathcal{N},);$" and insert --$(\text{mean}(d(x)), \text{ for } x \varepsilon \mathcal{N});$--, therefor.

In Column 9, Line(s) 7, delete "$(\max(d(x)), \text{ for } x\varepsilon\,\mathcal{N},);$" and insert --$(\max(d(x)), \text{ for } x \varepsilon \mathcal{N});$--, therefor.

Signed and Sealed this
Fifteenth Day of November, 2022

*Katherine Kelly Vidal*

Katherine Kelly Vidal
*Director of the United States Patent and Trademark Office*

In Column 14, Line(s) 51, after "zfxsut.net", insert --.--.

In Column 17, Line(s) 19, delete "Dike," and insert --['likr',--, therefor.

In Column 17, Line(s) 25, after "'pull',", insert --'fill',--.